United States Patent Office 2,741,058
Patented Apr. 10, 1956

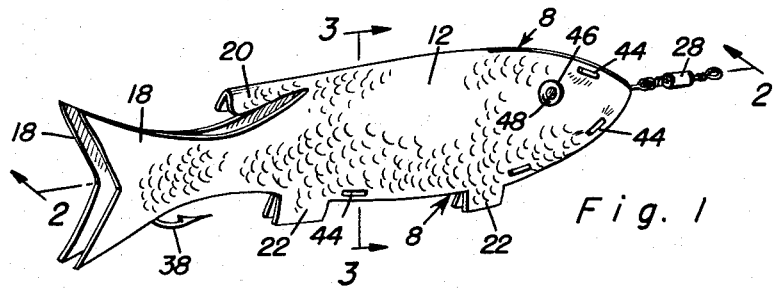
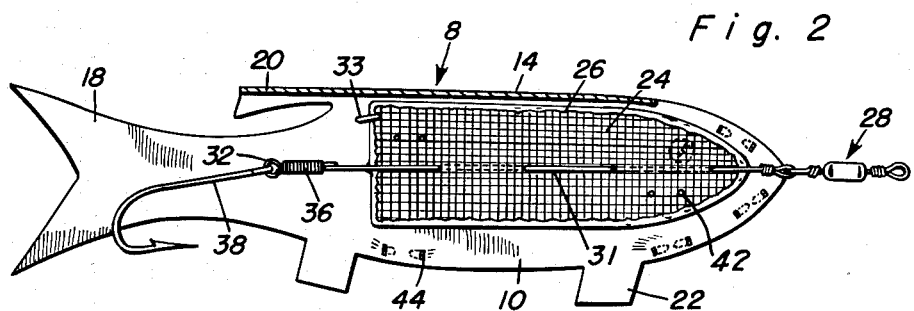
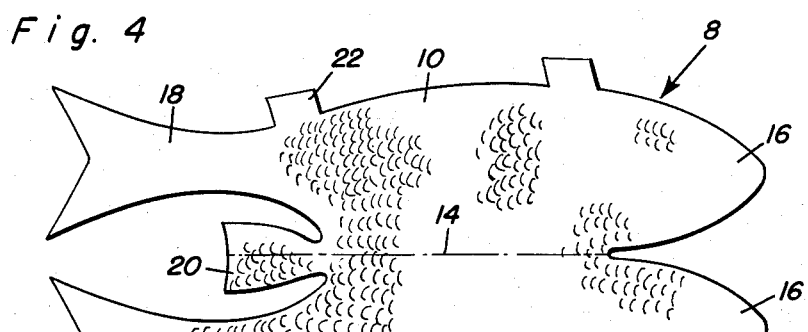
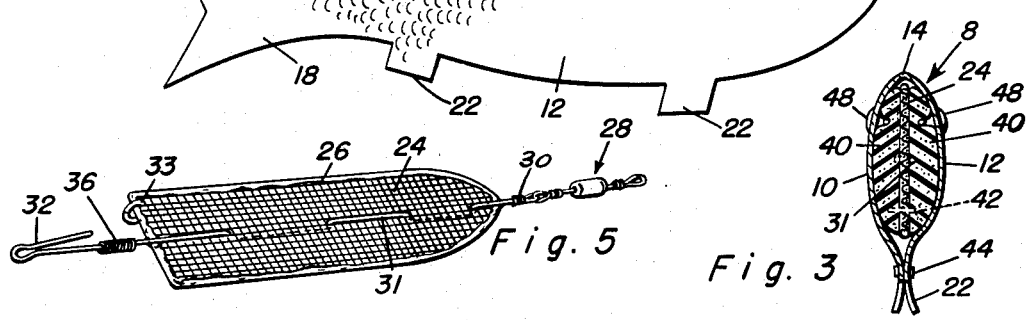
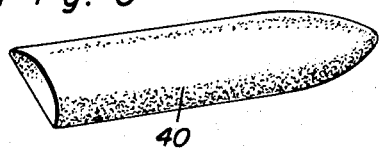
Jack S. Allman
INVENTOR.

2,741,058

FISHING LURE

Jack S. Allman, Juneau, Territory of Alaska; Ruth Coffin Allman, Juneau, Territory of Alaska, executrix of said Jack S. Allman, assignor to herself Application December 22, 1952, Serial No. 327,177

2 Claims. (Cl. 43—42.24)

The present invention relates to artificial fishing lures and has reference in particular to the physical properties and characteristics of said lure.

One object of the invention is to provide a lure which is thought to be unique, one which constitutes a close representation of a real live bait, a herring for example, which is highly desirable and aptly suitable in fishing for salmon and which provides the user with many advantages not had when using either fresh or frozen bait.

Experience resulting from countless trial and error expeditions in fishing for salmon is persuasive that a herring becomes soft after a short period of trolling and time and again is pulled and dislodged from the hook by the very drag of the water itself. Secondly, a herring will seldom stand one mis-strike and because of this the fisherman is called upon to repeatedly reel the line in for bait checking purposes. With these and other annoyances and disadvantages in mind it is an obvious object here to bring into being a new kind of a lure, an outstanding feature of which is the incorporation therein of genuine salmon skin which latter is marginally shaped to represent a herring and which is specially stuffed to provide a satisfactory lure by reason of the fact that salmon skin has been found to be such that it will withstand and survive hundreds of strikes, will retain the desired attraction, brightness in appearance, and will reduce to a minimum the necessity of carrying messy refrigerated bait.

The finished product is novel in that it is characterized by filler means which is used for stuffing a cut-out raw salmon skin wherein said filler means is tractable and will hold its shape when twisted or otherwise bent by the user all with a view toward providing a lure whose life-like properties are calculated to bring about efficacious results.

Other objects, features and advantages will become more readily apparent from the following description and the accompanying sheet of illustrative drawings.

In the accompanying drawings wherein like numerals are employed to designate like parts throughout the views:

Figure 1 is a perspective view of an artificial salt water trolling lure constructed in accordance with the principles of the present invention;

Figure 2 is a view with parts in a section and elevation taken approximately on the plane of the line 2—2 of Figure 1;

Figure 3 is a cross-section on the line 3—3 of Figure 1;

Figure 4 is a detail plan view of the fish skin covering of the lure showing the pattern required for effective results;

Figure 5 is a detail perspective of one of the salient components or parts of the skin stuffing and filling core; and Figure 6 is a detail perspective view of another component of the core.

As before stated one of the salient features and improvements has to do with a raw fish skin covering for my lure and this is denoted in Figure 4 by the numeral 8. This particular item is cut-out to present the pattern shown and so that the finished lure will resemble, as closely as possible, a herring, the natural food of salmon. The complemental duplicate interconnected halves which go to make up the body portion are denoted by the numerals 10 and 12 and they fold into spaced opposed relation on the fold line 14. There are complemental head portions at the leading end denoted by the numerals 16—16 and duplicate suitably shaped tail portions 18—18. The extra appendages 20 and 22 assist in providing the desirably completed covering including, of course, the natural shimmering scales. The skin covering may be kept in bottles containing a 100% saline solution. It is within the purview of the invention that this skin may be treated with an astringent fixative to assist in setting the scales and to toughen up and render the skin more durable than would be the natural or raw skin at the time it is taken from the live fish.

As important as the natural characteristics attainable from the raw fish skin which is used as the wrapper or covering is the deformable core means which serves either as a stuffing or filler for the skin in the manner shown. An essential part of this is a bendable wire screen or an equivalent element denoted by the numeral 24. This is cut-out so that the leading end at least is of pointed contour to cooperate with the head portions 16—16 of the skin. The main thing about this item is that it is marginally framed by a border of malleable or tractable material such as lead or the like. In actual practice solder 26 has been employed and this encloses the raw ends of the marginal portions of the screen and provides a framed screen which lends itself to twisting and bending to conform with the fisherman's idea of shaping up the finished lure to provide realistic and intriguing live action results when trolled in the water. A swivel is denoted at 28 and this is suitably fastened at 30 to the leading end of the stainless steel wire 31. A clip 32 is joined with the trailing end of said wire 31. With further reference to the wire this shall be of a length greater than the over-all length of the screen. At the leading end the wire is twisted and formed into an eye to which the swivel 28 is connected. The intermediate portion of the wire is laced or threaded through the meshes of the screen 24 and the trailing end projects rearwardly of the screen and is formed into the aforementioned clip means 32. This wire will not corrode and therefore provides a reliable means for joining the swivel and fish hook accommodating clip to the respective leading and trailing ends of the screen. There is a slidable keeper or sleeve 36 which serves to assist in holding the shank of the fish hook in place. The other laminations which go to make up the core are pieces of foam rubber 40 which are cut out to conform in shape with the framed screen. They are superimposed against opposite sides of the screen and are secured thereto by appropriate fasteners 42. With the core thus devised the natural skin is wrapped around it to form the "herring" and suitable staples or fasteners 44 are employed to maintain the parts in cooperative relationship.

Each imitation eye comprises a disk of amber plastic 46 with a bead such as a black rivet 48 associated therewith and forming the pupil of the eye.

With reference now to Figures 2 and 5, attention is directed to the element 33. This is a small black iron ring which is purposely attached to the screen wire and which functions, as is obvious, as an electrolysis absorption unit. It is evident that this ring will absorb the electrolysis action which would otherwise directly attack the screen wire and will be attacked by the electrolysis action itself and, of course, in due time it will be eaten up. It has been found that in salt water fishing this sort of screen prolonging feature is necessary for otherwise the screen wire, less it be of some unusual non-corrodible character, would corrode and become defective.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A lure usable in fishing for salmon comprising a laminated core embodying a bendable, twistable and otherwise deformable central lamination comprising a flexible screen having a border of malleable metal encompassing the marginal edge portions of said screen whereby any predetermined shape given to the core by hand will be maintained, and complemental laminations of plump foam rubber superimposed against opposite sides of and secured to said screen, and a covering loosely encasing and enveloping said laminated core, said covering being shaped to represent a small herring, the latter being free of positive mechanical connection with said laminated core and being formed from natural scale-equipped fish skin cut from real fish, said covering being folded into half-portions and marginally delineated to represent cooperating head, tail and fin portions, the cooperating edges of said half-portions being free and overlapped and fastened together whereby the then finished product represents a miniature herring.

2. The structure defined in claim 1 and the combination therewith of a single length of stainless steel wire of a length greater than the length of the screen, the intermediate portion of the wire being laced and thus threaded through the meshes of the screen, the trailing end of said wire projecting rearwardly of the screen and being provided with a clip carrying a fishhook, the forward end of said wire projecting beyond the corresponding end of the screen and head of the covering, and a fishing line swivel attached to said forward end.

References Cited in the file of this patent
UNITED STATES PATENTS

| | | |
|---|---|---|
| 982,974 | Miller | Jan. 31, 1911 |
| 1,442,761 | Beach | Jan. 16, 1923 |
| 1,611,117 | Kearns | Dec. 14, 1926 |
| 1,727,184 | Thompson | Sept. 3, 1929 |
| 1,777,004 | Lemere et al. | Sept. 30, 1930 |
| 1,787,980 | Harris | Jan. 6, 1931 |
| 1,982,732 | Fletcher et al. | Dec. 4, 1934 |
| 2,092,304 | Eger | Sept. 7, 1937 |
| 2,215,772 | Vecchia | Sept. 24, 1940 |
| 2,375,290 | Docteur | May 8, 1945 |